US012192156B2

(12) United States Patent
Taitz

(10) Patent No.: US 12,192,156 B2
(45) Date of Patent: *Jan. 7, 2025

(54) INVITATION MEDIA OVERLAYS FOR SHARED COLLECTIONS OF MEDIA CONTENT ITEMS

(71) Applicant: Snap Inc., Santa Monica, CA (US)

(72) Inventor: David Phillip Taitz, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/355,001

(22) Filed: Jul. 19, 2023

(65) Prior Publication Data

US 2023/0362114 A1 Nov. 9, 2023

Related U.S. Application Data

(63) Continuation of application No. 16/880,660, filed on May 21, 2020, now Pat. No. 11,750,542.

(Continued)

(51) Int. Cl.
G06F 15/16 (2006.01)
H04L 51/043 (2022.01)
(Continued)

(52) U.S. Cl.
CPC ............ *H04L 51/043* (2013.01); *H04L 51/08* (2013.01); *H04L 51/10* (2013.01); *H04L 51/52* (2022.05); *H04N 5/272* (2013.01); *H04N 5/278* (2013.01)

(58) Field of Classification Search
CPC ....... H04L 51/043; H04L 51/52; H04L 51/08; H04L 51/10; H04N 5/272; H04N 5/278
(Continued)

(56) References Cited

U.S. PATENT DOCUMENTS 8,285,810 B2 * 10/2012 Svendsen .......... G06F 16/24556
709/205
9,118,723 B1 8/2015 Su et al.
(Continued)

FOREIGN PATENT DOCUMENTS

CN 115552403 A 12/2022
CN 115668887 A 1/2023
(Continued)

OTHER PUBLICATIONS

"U.S. Appl. No. 16/880,660, Final Office Action mailed Mar. 16, 2022", 15 pgs.
(Continued)

*Primary Examiner* — Kaylee J Huang
(74) *Attorney, Agent, or Firm* — Schwegman Lundberg & Woessner, P.A.

(57) ABSTRACT

Method starts with a processor receiving first media content item from first client device and selection of invitation media overlay to be applied to first media content item. Processor generates modified first media content item by overlaying invitation media overlay on first media content item. Processor generates shared collection of media content items comprising modified first media content item. Processor receives selection of second and third user and causes modified first media content item to be displayed by second and third client devices. Processor receives selection of invitation media overlay from second and third client devices and causes shared collection to be displayed second and the third client devices. Processor receives second media content item from second client device, updates shared collection to comprise second media content item and causes updated shared collection to be displayed by first and third client devices. Other embodiments are also disclosed herein.

20 Claims, 20 Drawing Sheets

Related U.S. Application Data

(60) Provisional application No. 62/704,188, filed on Apr. 27, 2020.

(51) Int. Cl.
*H04L 51/08* (2022.01)
*H04L 51/10* (2022.01)
*H04L 51/52* (2022.01)
*H04N 5/272* (2006.01)
*H04N 5/278* (2006.01)

(58) Field of Classification Search
USPC .................. 709/206, 204, 207, 203, 217
See application file for complete search history.

(56) References Cited

U.S. PATENT DOCUMENTS

| | | | |
|---|---|---|---|
| 9,667,676 B1* | 5/2017 | Lo | G06F 3/1454 |
| 9,923,851 B1 | 3/2018 | Sprauve et al. | |
| 10,387,514 B1 | 8/2019 | Yang et al. | |
| 10,559,107 B1 | 2/2020 | Charlton et al. | |
| 10,623,917 B1 | 4/2020 | Paul | |
| 11,665,116 B2 | 5/2023 | Taitz | |
| 11,750,542 B2 | 9/2023 | Taitz | |
| 11,916,854 B2 | 2/2024 | Taitz | |
| 2014/0053236 A1* | 2/2014 | Kidron | G06Q 30/0222 |
| | | | 726/1 |
| 2014/0313352 A1 | 10/2014 | De Rosa et al. | |
| 2015/0013016 A1* | 1/2015 | Kanter | G06F 21/6245 |
| | | | 726/28 |
| 2015/0326620 A1 | 11/2015 | Kohnen et al. | |
| 2015/0365600 A1* | 12/2015 | Pollack | H04N 5/2621 |
| | | | 348/239 |
| 2016/0196052 A1 | 7/2016 | Franklin et al. | |
| 2017/0221095 A1 | 8/2017 | Gauglitz et al. | |
| 2018/0032235 A1 | 2/2018 | Choi et al. | |
| 2018/0337994 A1 | 11/2018 | Dachille et al. | |
| 2019/0007507 A1 | 1/2019 | Lonkar et al. | |
| 2019/0102570 A1 | 4/2019 | Broussard et al. | |
| 2019/0171338 A1 | 6/2019 | Voss et al. | |
| 2020/0226696 A1* | 7/2020 | Darling | G06Q 50/01 |
| 2020/0403951 A1* | 12/2020 | Kapoor | H04L 51/216 |
| 2021/0336908 A1 | 10/2021 | Taitz | |
| 2021/0336909 A1 | 10/2021 | Taitz | |
| 2023/0328010 A1 | 10/2023 | Taitz | |
| 2024/0179111 A1 | 5/2024 | Taitz | |

FOREIGN PATENT DOCUMENTS

| | | |
|---|---|---|
| CN | 117056963 A | 11/2023 |
| EP | 3343441 A1 | 7/2018 |
| KR | 101467415 B1 | 12/2014 |
| KR | 102542427 B1 | 6/2023 |
| KR | 102655795 B1 | 4/2024 |
| WO | WO-2021222198 A1 | 11/2021 |
| WO | WO-2021222225 A1 | 11/2021 |

OTHER PUBLICATIONS

"U.S. Appl. No. 16/880,660, Non Final Office Action mailed Oct. 14, 2022", 15 pgs.
"U.S. Appl. No. 16/880,660, Non Final Office Action mailed Nov. 24, 2021", 15 pgs.
"U.S. Appl. No. 16/880,660, Notice of Allowance mailed Apr. 18, 2023", 16 pgs.
"U.S. Appl. No. 16/880,660, Response filed Jan. 16, 2023 to Non Final Office Action mailed Oct. 14, 2022", 16 pgs.
"U.S. Appl. No. 16/880,660, Response filed Feb. 24, 2022 to Non Final Office Action mailed Nov. 24, 2021", 12 pgs.
"U.S. Appl. No. 16/880,660, Response filed Jun. 16, 2022 to Final Office Action mailed Mar. 16, 2022", 12 pgs.
"U.S. Appl. No. 16/880,728, Corrected Notice of Allowability mailed Feb. 1, 2023", 2 pgs.
"U.S. Appl. No. 16/880,728, Final Office Action mailed May 20, 2022", 22 pgs.
"U.S. Appl. No. 16/880,728, Non Final Office Action mailed Nov. 26, 2021", 22 pgs.
"U.S. Appl. No. 16/880,728, Notice of Allowance mailed Jan. 19, 2023", 15 pgs.
"U.S. Appl. No. 16/880,728, Response filed Mar. 28, 2022 to Non Final Office Action mailed Nov. 26, 2021", 12 pgs.
"U.S. Appl. No. 16/880,728, Response filed Sep. 20, 2022 to Final Office Action mailed May 20, 2022", 13 pgs.
"International Application Serial No. PCT/US2021/029329, International Preliminary Report on Patentability mailed Nov. 10, 2022", 8 pgs.
"International Application Serial No. PCT/US2021/029329, International Search Report mailed Jul. 23, 2021", 5 pgs.
"International Application Serial No. PCT/US2021/029329, Written Opinion mailed Jul. 23, 2021", 6 pgs.
"International Application Serial No. PCT/US2021/029369, International Preliminary Report on Patentability mailed Nov. 10, 2022", 6 pgs.
"International Application Serial No. PCT/US2021/029369, International Search Report mailed Aug. 17, 2021", 3 pgs.
"International Application Serial No. PCT/US2021/029369, Written Opinion mailed Aug. 17, 2021", 7 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL:https://www.theverge.com/2013/10/3/4791934/snapchats-next-big-thing-stories-that-dont-just-disappear>, (Oct. 3, 2013), 5 pgs.
U.S. Appl. No. 16/880,728 U.S. Pat. No. 11,665,116, filed May 21, 2020, Invitation Media Overlays for Private Collections of Media Content Items.
U.S. Appl. No. 18/323,869, filed May 25, 2023, Invitation Media Overlays for Private Collections of Media Content Items.
U.S. Appl. No. 16/880,660, filed May 21, 2020, Invitation Media Overlays for Shared Collections of Media Content Items.
"U.S. Appl. No. 16/880,660, Corrected Notice of Allowability mailed Jul. 26, 2023", 2 pgs.
"U.S. Appl. No. 18/323,869, Notice of Allowance mailed Oct. 17, 2023", 11 pgs.
"European Application Serial No. 21725939.9, Communication Pursuant to Article 94(3) EPC mailed Sep. 27, 2023", 4 pgs.
"European Application Serial No. 21795426.2, Extended European Search Report mailed Jan. 3, 2024", 7 pgs.
"U.S. Appl. No. 18/323,869, Corrected Notice of Allowability mailed Jan. 23, 2024", 2 pgs.
"Chinese Application Serial No. 202180037518.0, Office Action mailed May 31, 2024", w/ English translation, 19 pgs.
"European Application Serial No. 21725939.9, Communication Pursuant to Article 94(3) EPC mailed Feb. 22, 2024", 4 pgs.
"European Application Serial No. 21725939.9, Communication Pursuant to Article 94(3) EPC mailed Apr. 10, 2024", 4 pgs.
"European Application Serial No. 21725939.9, Response filed Feb. 7, 2024 to Communication Pursuant to Article 94(3) EPC mailed Sep. 27, 2023", 9 pgs.
"European Application Serial No. 21795426.2, Response filed Jul. 23, 2024 to Extended European Search Report mailed Jan. 3, 2024", 6 pgs.

(56) References Cited

OTHER PUBLICATIONS

"European Application Serial No. 21725939.9, Response filed Aug. 6, 2024 to Communication Pursuant to Article 94(3) EPC mailed Apr. 10, 2024", 4 pgs.

* cited by examiner

INVITATION MEDIA OVERLAYS FOR SHARED COLLECTIONS OF MEDIA CONTENT ITEMS

CROSS REFERENCED TO RELATED APPLICATIONS

This application is a continuation of U.S. patent application Ser. No. 16/880,660, filed May 21, 2020, which application claims priority to U.S. Provisional Patent Application Ser. No. 62/704,188, filed Apr. 27, 2020, the contents of which are incorporated herein by reference in their entireties.

BACKGROUND

Electronic messaging, particularly instant messaging, continues to grow globally in popularity. Users are quickly able to share with one another electronic media content items including text, electronic images, audio, and video instantly.

With the increasing number of users on social networking systems, each user also has a growing network of individuals that she follows. Therefore, in order to maintain the user's engagement on social networking systems, it is paramount that the systems have the ability to present to each user the media content items that are most interesting or relevant to her. In addition to the need to curate the media content items, the social networking systems are also presented with the challenge of providing a graphical user interface that captivates the user's attention and allows her to view the curated media content items and further interact the network of individuals that she follows.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

In messaging systems, users are connected to a variety of other users with whom they have different levels and types of relationships. For example, a user can be connected to a group of his close friends as well as his co-workers, acquaintances as well as people he does not know outside of the messaging system.

Embodiments of the present disclosure improve the functionality of electronic messaging software and systems by recognizing that the user may want to share media content items with one group of users (e.g., close friends) and not with the rest of the users he is connected to on the messaging system. Specifically, the embodiments of the present disclosure generates invitation media overlay that are used to invite one or more selected users (e.g., recipients) to join a private group that have access to a shared collection of media content items (e.g., images, pictures, text, video, audio, etc.) generated by the user (e.g., the sender) as well as the users in the private group. In addition to private groups being created based on relationships, private groups can also be created around a specific event (e.g., Team Lunch) or topic (e.g., Surfing).

When recipients receives a media content item with the invitation media overlay from the sender, the recipients are more inclined to continue engaging with the messaging system and send a response to the sender when the media content item that he received appears to be a direct personal message and allows him to join the private group. By further having the recipients be participants in the content created for shared collection for this private group, user engagement with the messaging system can be further increased.

Networked Computing Environment

Figure 1:
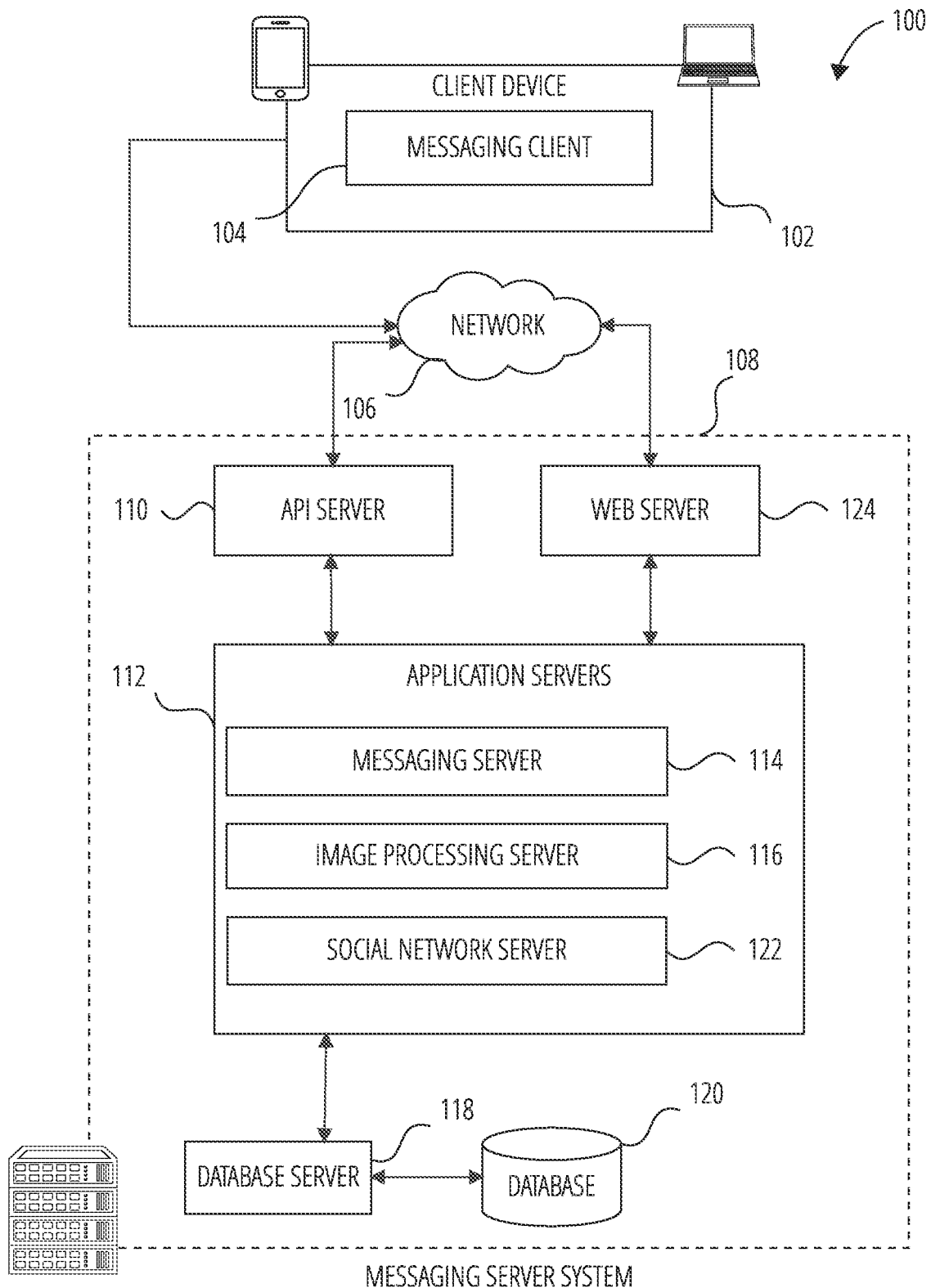
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
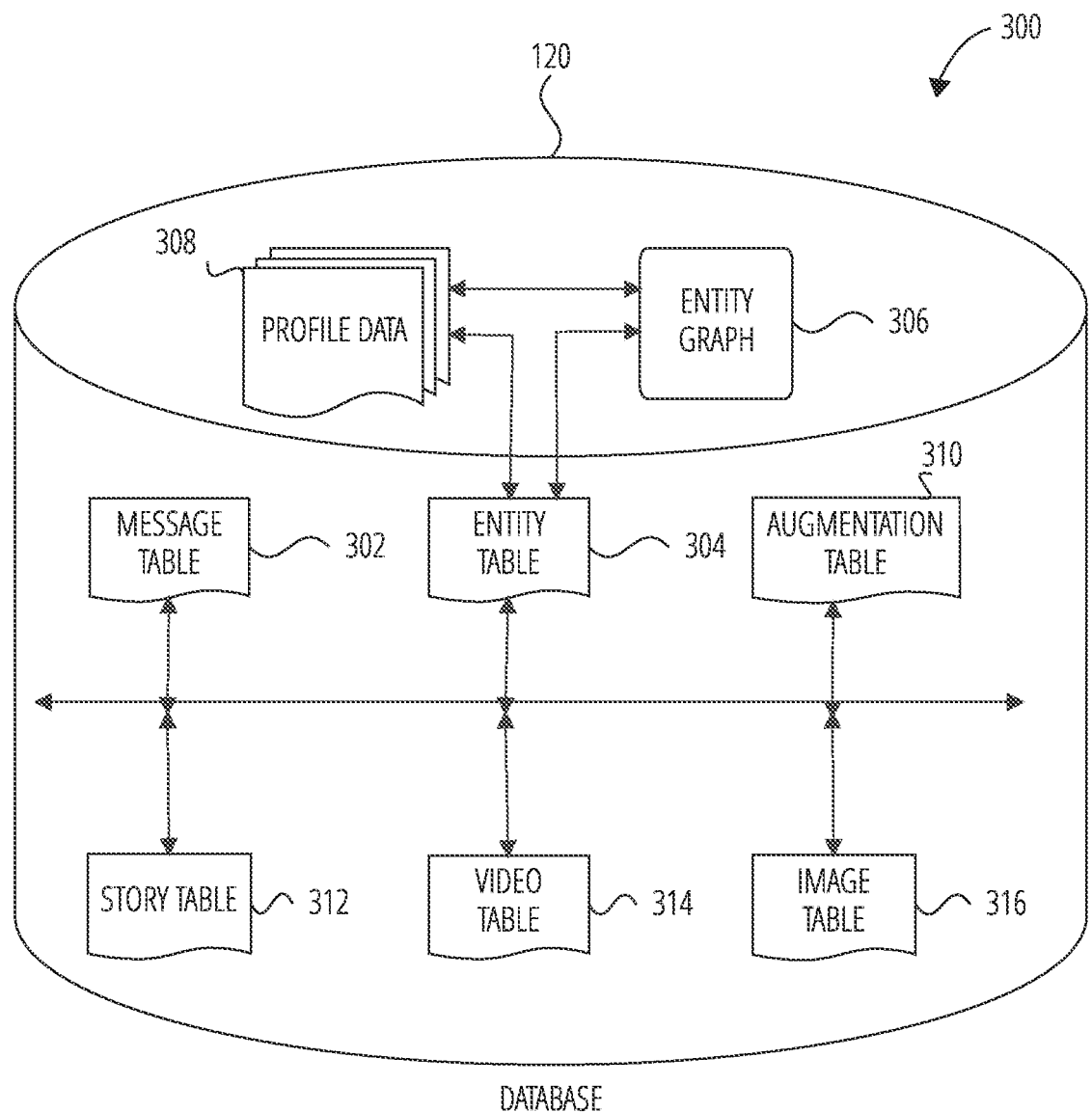
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
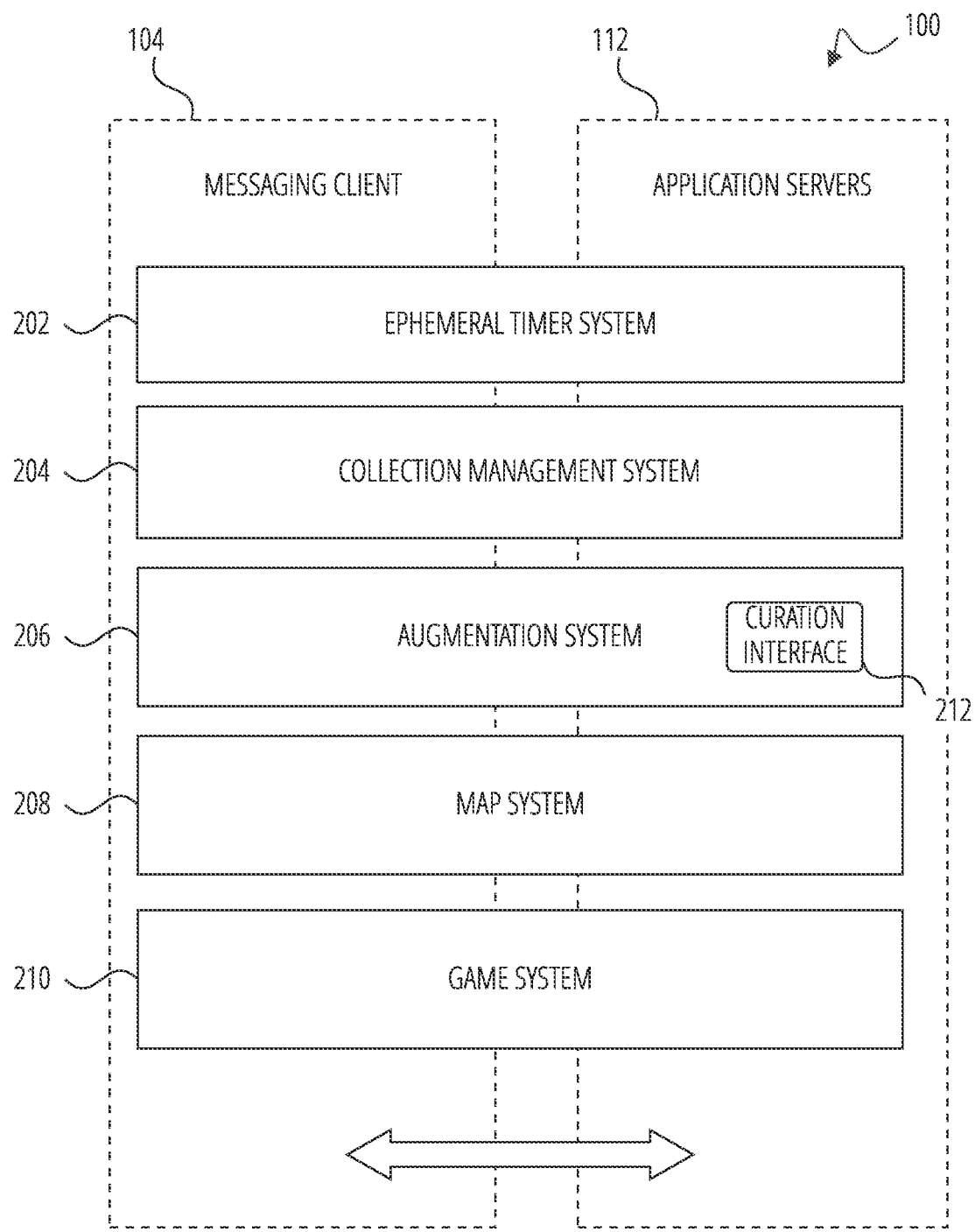
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104. In one embodiment, the collection management system 204 can be responsible for managing a shared collection of media content items that can only be viewed by a group of users in the messaging system that are selected by the creator of the shared collection (e.g., the private group). In one embodiment, the shared collection of media content items can be modified by the creator of the shared collection as well as the other members of the private group. For example, the collection management system 204 only processes and implements modifications such as adding, deleting, or editing the media content items included in the shared collection that are received from client devices 102 of the members of the private group. The shared collection can also be a "shared story" such that the shared collection be made available for a specified time period, that is enforced by the ephemeral timer system 202.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118. In one embodiment, the augmentation system 206 generates the invitation media overlays for the shared collection of media content items. The invitation overlay can include a text that identifies the shared collection of media content items. The invitation overlay can also include an avatar of associated with the user that created the shared collection. In some embodiments, the invitation overlay can also include avatars of associated with the users in the private group.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media, overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via, the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. The user-selected filters can include an invitation media overlay that is associated with a shared collection of media content items.

Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
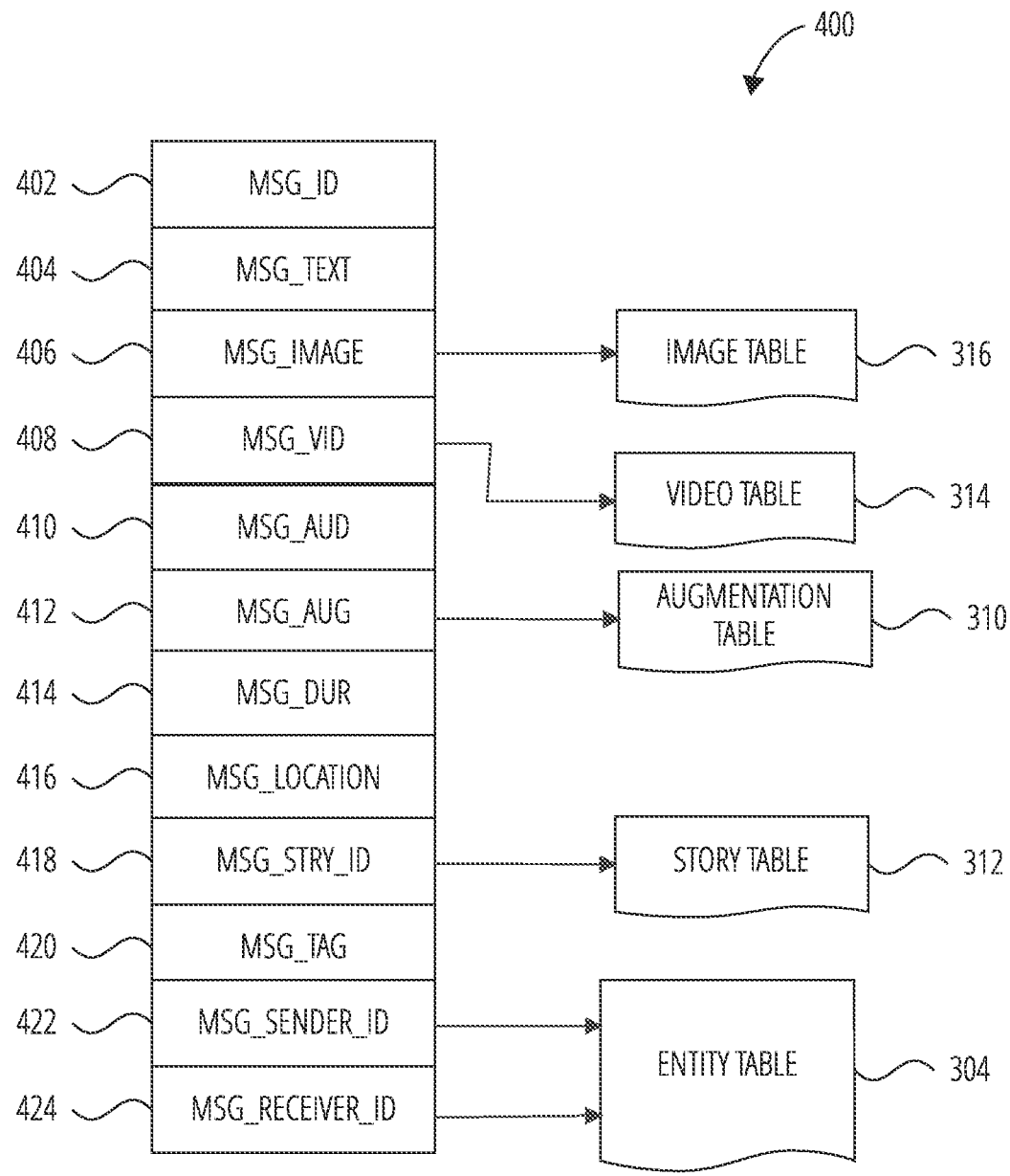
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent, message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
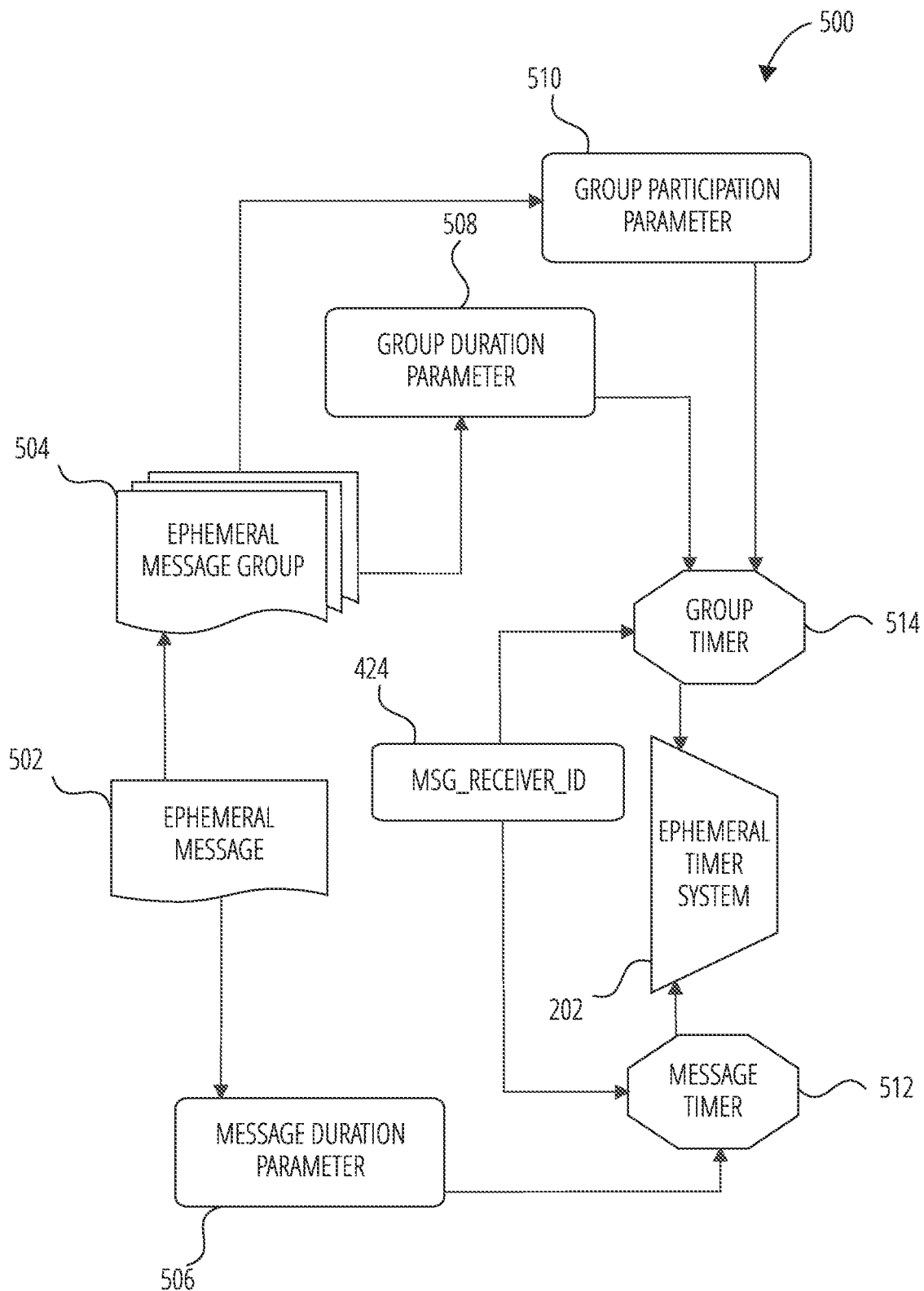
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Invitation Media Overlay

In one embodiment, a first user associated with a first client device 102 can generate a shared collection of media content items (e.g., a shared story) that is shared with only a select group of users (e.g., close friends, team dinner members, surfing friends, etc.). To invite the users to join a group that can view his shared story, an invitation media overlay (e.g., shared story sticker) can be overlaid on a media content item that is shared as a "story" to the select group of users (e.g., private group) or as a direct message to each of users in the select group of users. The select group of users (e.g., recipients) can join the shared story by selecting the invitation media overlay.

Figure 6:
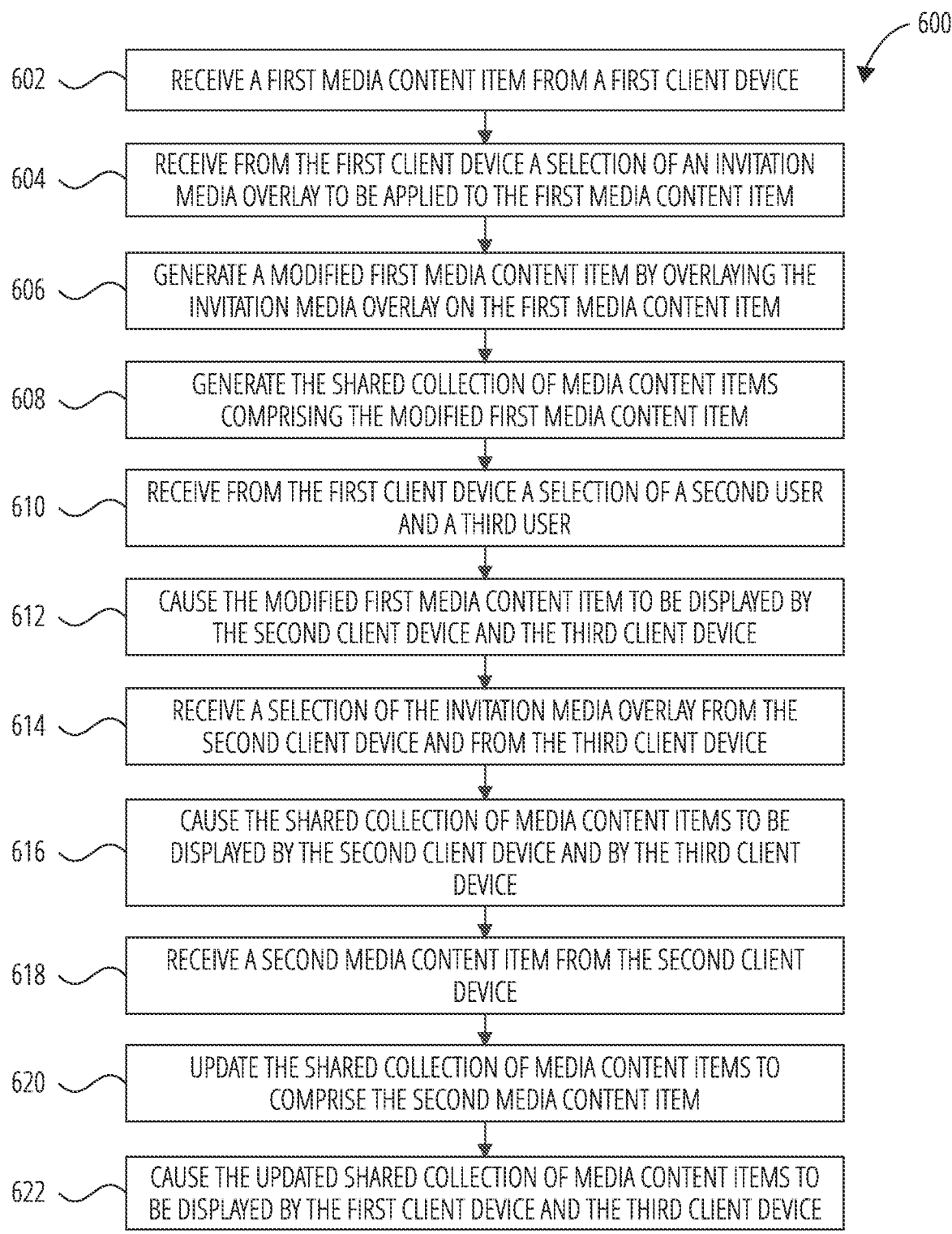
FIG. 6 illustrates a process 600 of generating invitation media overlays for shared collections of media content items in accordance with one embodiment.

FIG. 6 illustrates a process 600 of generating invitation media overlays for shared collections of media content items in accordance with one embodiment. The operations of process 600 may be performed by any number of different systems, such as the messaging server 114 or the messaging client 104 described herein, or any portion thereof, such as a processor included in any of the systems.

Figure 7:
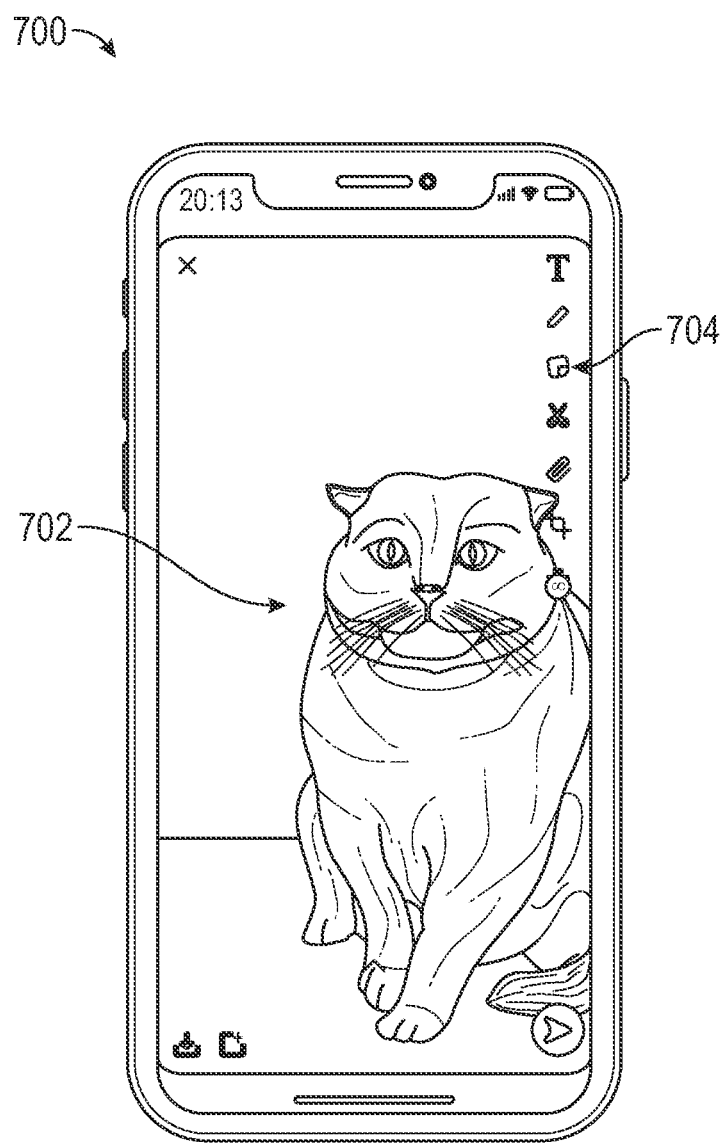
FIG. 7 illustrates a user interface 700 displayed on a client device in accordance with one embodiment.
Figure 8:
FIG. 8 illustrates a user interface 800 displayed on a client device in accordance with one embodiment.

At operation 602, the processor receives a first media content item from a first client device 102 that is associated with a first user. The media content item can be images, pictures, videos, text, or any combination thereof. The first user can capture the media content item using a camera included in the first client device 102. FIG. 7 illustrates user interface 700 that can be displayed on the first client device 102. The media content item 702 as shown in FIG. 7 is a picture or photograph of a cat. The user interface 700 also includes a sticker menu icon 704. When the first user selects the sticker menu icon 704, the user interface 800 in FIG. 8 is displayed by the first client device 102. The user interface 800 includes different media overlays that can be applied to augment the media content item 702.

At operation 604, the processor receives from the first client device 102 a selection of an invitation media overlay to be applied to the first media content item. The invitation media overlay can be associated with a shared collection of media content items. In user interface 800 in FIG. 8, the invitation media overlay selectable item 802 is a selectable item included in the plurality of media overlays that are available to the first user to apply to the media content item 702. In this embodiment, when the first user selects the invitation media overlay selectable item 802, the processor receives from the first client device 102 the selection of the invitation media overlay. The invitation media overlay selectable item 802 is associated with an invitation media overlay that invites a recipient user to a join a collection of media content items (e.g., a story). The collection can be a shared collection such that the first user who is the creator of the shared collection can edit the shared collection and the users that the first user has selected to be in the private group can also edit the shared collection. In one embodiment, the users in the private group can also add other users to the private group.

Figure 9:
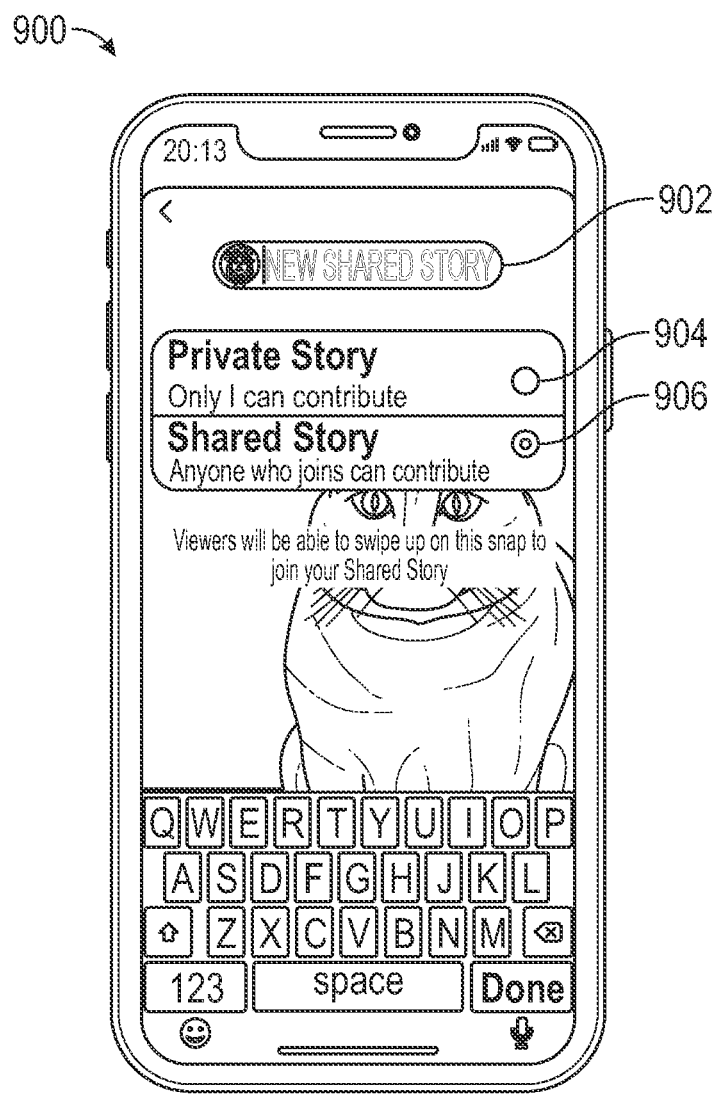
FIG. 9 illustrates a user interface 900 displayed on a client device in accordance with one embodiment.

In one embodiment, the processor can cause a shared selectable item 906 to be displayed by the first client device 102. The processor can also cause a text input item 902 to be displayed by the first client device 102. As shown in FIG. 9, in response to the selection of the invitation media overlay selectable item 802, a user interface 900 can be displayed by the first client device 102. The user interface 900 can include a text input item 902, a privacy selectable item 904, and a shared selectable item 906.

When the first user selects the privacy selectable item 904, the processor receives a selection of the privacy selectable item 904 from the first client device 102. In response to receiving the selection of the privacy selectable item 904 from the first client device 102, the processor establishes that collection is private and can only be modified by the first client device 102.

When the first user selects the shared selectable item 906, the processor receives the selection of the shared selectable item 906 from the first client device 102 and establishes that the collection of media content items is a shared collection of media content items. The shared collection of media content items can be modified other users such as the selected users in the group.

As shown in FIG. 9, the privacy selectable item 904, and the shared selectable item 906 can be radio buttons that can be selected. In other embodiments, the privacy selectable item 904, and the shared selectable item 906 can be selectable items such as text, links, icons, images, etc.

Figure 10:
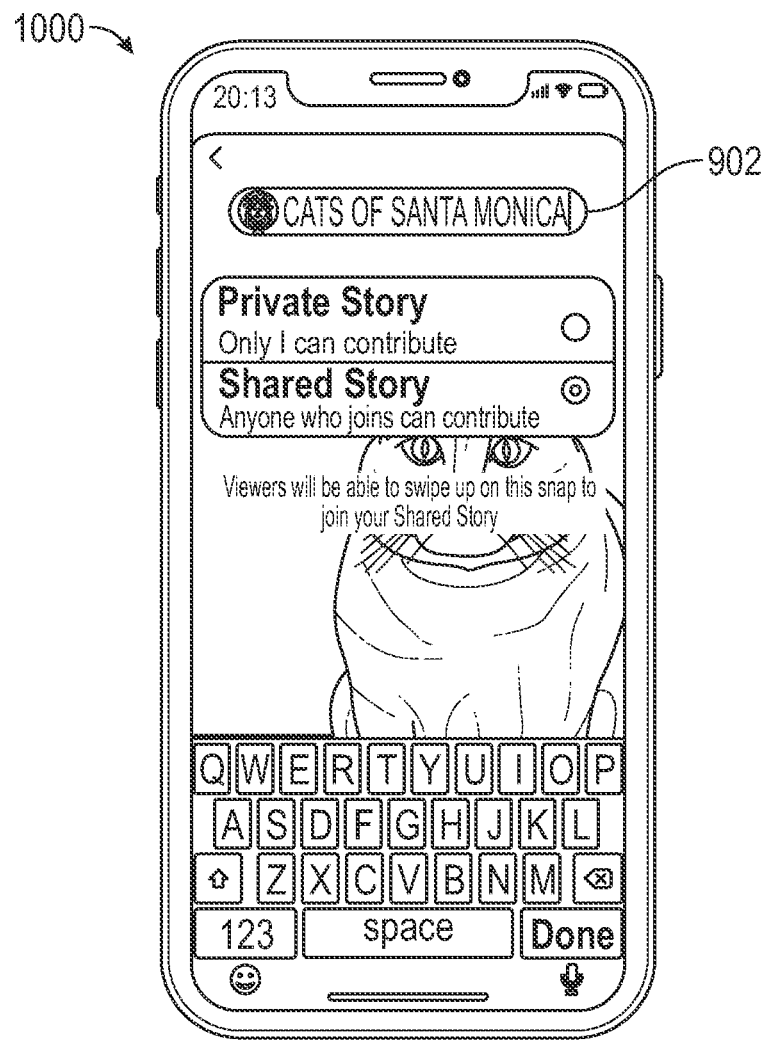
FIG. 10 illustrates a user interface 1000 displayed on a client device in accordance with one embodiment.

The processor can also receive a text from the first client device 102 via the text input item 902 in user interface 900. As shown in FIG. 10, the user interface 1000 that can be displayed by the first client device 102 illustrates that the first user has input the text "Cats of Santa Monica" in text input item 902. The text can be the title associated with the shared collection of media content items.

At operation 606, the processor generates a modified first media content item by overlaying the invitation media overlay on the first media content item.

Figure 11:
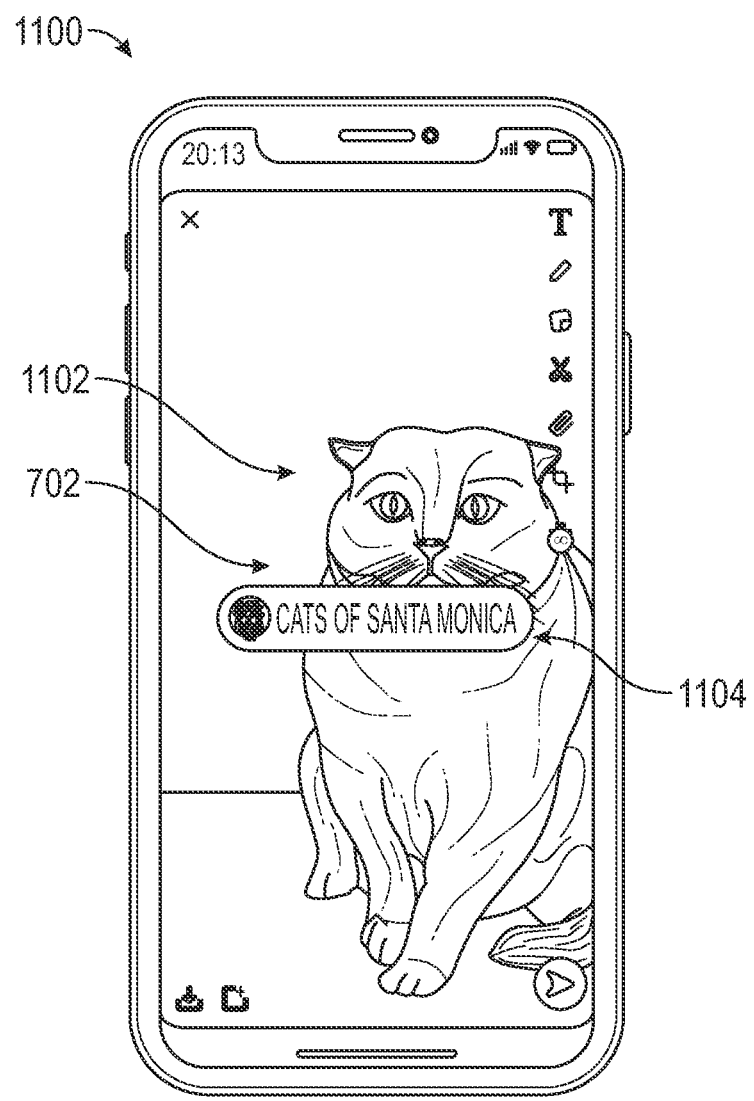
FIG. 11 illustrates a user interface 1100 displayed on a client device in accordance with one embodiment.

In FIG. 11, the user interface 1100 that can be displayed by the first client device 102 is shown. Once the text "Cats of Santa Monica" is input by the first user in text input item 902 and the shared selectable item 906 is selected, the user interface 1100 is caused to be displayed by the first client device 102 which includes the modified media content item 1102. As shown in FIG. 11, the modified media content item 1102 includes the invitation media overlay 1104 that is overlaid on the media content item 702. The invitation media overlay 1104 can include the text that is input in the text input item 902 (e.g., "Cats of Santa Monica"). In one embodiment, the invitation media overlay 1104 can also comprise an icon that includes an avatar of the creator of the shared collection (e.g., the first user). The icon can also include avatars of the other users in the private group. To indicate that the story or collection is a shared collection, the icon can also include an image of a silhouette of group of individuals as shown in invitation media overlay 1104.

At operation 608, the processor generates the shared collection of media content items. The shared collection of media content items comprises the modified first media content item (e.g., modified media content item 1102). In one embodiment, the shared collection of media content items includes a plurality of media content items received from the first client device 102 and from client devices 102 of other users in the private group.

At operation 610, the processor receives from the first client device a selection of a second user associated with a second client device 102 and a third user associated with a third client device 102. The second user and the third user are selected by the first user to be included in the select group of users (e.g., private group) that can view and edit the shared collection. The private group can include one or more users associated with one or more client devices 102. In one embodiment, the processor generates a private group associated with the shared collection of media content items. The private group, for example, can comprise the first user, the second user, and the third user.

At operation 612, the processor causes the modified first media content item to be displayed by the second client device 102 and the third client device 102.

In one embodiment, the second client device 102 and the third client device 102 can receive the modified first modified media content item 1102 as a story or collection. For example, the processor can cause the second client device 102 and the third client device 102 to display a story icon associated with this modified media content item 1102 from the first user. The first user's shared collection's story icon can be included in a plurality of story icons associated with a plurality of users that are connected to the second user (e.g., second user's connections or friends) on the messaging system 100. Similarly, the first user's shared collection's story icon can be included in a plurality of story icons associated with a plurality of users that are connected to the third user (e.g., third user's connections or friends) on the messaging system 100. In this embodiment, the modified media content item 1102 from the first user is broadcast to the users in the private group as a story that is available for a limited amount of time.

Figure 14:
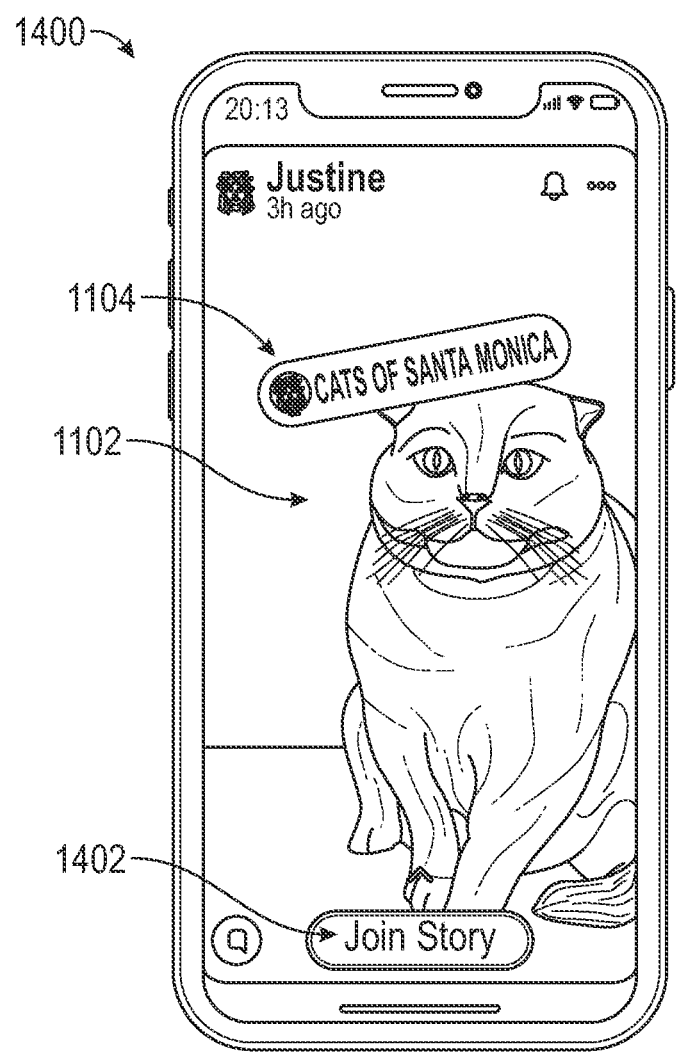
FIG. 14 illustrates a user interface 1400 displayed on a client device in accordance with one embodiment.

When the second user selects the first user's shared collection's story icon, the user interface 1400 in FIG. 14 can be displayed by the second client device 102. The user interface 1400 includes the modified media content item 1102 with the invitation media overlay 1104. The user interface 1400 also includes the invitation response selectable item 1402. The second user can select either the invitation media overlay 1104 or the invitation response selectable item 1402 to join the shared story or collection (e.g., "Cats of Santa Monica"). In other words, the second user can join the private group that has access to view and edit (or contribute to) this shared collection of media content items.

Similarly, when the third user selects the first user's shared collection's story icon, the user interface 1400 in FIG. 14 can be displayed by the third client device 102. The third user can select either the invitation media overlay 1104 or the invitation response selectable item 1402 to join the shared story or collection "Cats of Santa Monica"). The third user can thus join the private group that has access to view and edit (or contribute to) this shared collection of media content items.

Figure 15:
FIG. 15 illustrates a user interface 1500 displayed on a client device in accordance with one embodiment.

When the second user and the third user select the invitation media overlay 1104, at operation 614, the processor receives a selection of the invitation media overlay from the second client device 102 or the third client device 102, respectively. In one embodiment, when the second user and the third user select the invitation response selectable item 1402, the processor causes the user interface 1500 to be displayed on the second client device 102 and the third client device 102, respectively, as shown in FIG. 15.

The user interface 1500 includes the invitation details display 1502 that can be a pop-up or scroll up notification that is overlaid on the user interface 1400. The invitation details display 1502 can include the information included in the invitation media overlay 1104 such as the text (e.g., "Cats of Santa Monica") and the icon with the first user's avatar. The invitation details display 1502 can also include text that invites the second user to join the story or collection. For example, the text can indicate that the first user invites the second user or third user to view and contribute to the shared collection of media content items (e.g., "Justine invited you to contribute to their shared story!"). The invitation details display 1502 also includes an invitation details response selectable item 1504. The second user or the third user can select the invitation details response selectable item 1504 to respond to the invitation to join the shared story. In one embodiment, the processor can also receive the selection of the invitation media overlay from the second client device 102 in operation 614 when the second user or the third user selects the invitation details response selectable item 1504.

In another embodiment, the second client device 102 or the third client device 102 can receive the modified first modified media content item 1102 as a direct message from the first client device. When the modified media content item 1102 is received as a direct message, the user interface 1600 in FIG. 16 can be displayed by the second client device 102 or the third client device 102. The user interface 1600 comprises the message notifications that correspond to messages received from the first user Justine). The message notifications include the direct message notification 1602 and direct message invitation selectable item 1604. When the second user or the third user selects the direct message notification 1602, the user interface 1400 including the modified media content item 1102 can be displayed by the second client device 102 or the third client device 102. Alternatively, when the second user or the third user selects the direct message invitation selectable item 1604, the user interface 1700 can be displayed on the second client device 102 or the third client device 102, respectively. The user interface 1700 includes the invitation details display 1502 that is overlaid on the user interface 1600. The invitation details display 1502 in user interface 1700 can also include the invitation details response selectable item 1504.

At operation 616, the processor causes the shared collection of media content items to be displayed by the second client device 102 and by the third client device 102. In one embodiment, the shared collection is broadcast to the users in the private group as a story that is available for a limited amount of time. In one embodiment, the second client device 102 and the third client device 102 can receive a story notification associated with the shared collection. The story notification on the second client device 102 indicates that the shared collection includes media content items that has not yet been viewed by the second user. Similarly, the story notification on the third client device 102 indicates that the shared collection includes media content items that has not yet been viewed by the third user.

When the second user adds a second media content item to the shared collection, the processor receives the second media content item from the second client device 102, at operation 618. The second media content item can be captured using a camera included in the second client device 102. In one embodiment, the second client device 102 can capture a second media content item, select the sticker menu icon 704 in user interface 700 to cause the user interface 800 to be displayed on the second client device 102. The second user can select the invitation media overlay selectable item 802 and input a portion of text associated with the shared collection (e.g., "Cats of Santa Monica") in the text input item 902. As shown in user interface 1200 of FIG. 12, by inputting a portion of text in text input item 902, a plurality of collection selectable items 1202 having titles that include the portion of text that was input in the text input item 902 is caused to be displayed. In one example, if the second user input a portion of text "Cats", a collection selectable item associated with the shared collection (e.g., "Cats of Santa Monica") can appear in the plurality of collection selectable items 1202 in user interface 1200. In this example, the second user can add the media content item to the shared collection "Cats of Santa Monica" by selecting the collection selectable item associated with the shared collection (e.g., "Cats of Santa Monica").

At operation 620, the processor updates the shared collection of media content items to comprise the second media content item, and at operation 622, the processor causes the updated shared collection of media content items to be displayed by the first client device 102 and the third client device 102.

FIG. 7 illustrates the user interface 700 displayed on a client device 102 in accordance with one embodiment. The user interface 700 can be displayed on the first client device 102 that is creating a media content item for the shared collection. The media content item 702 can be an image, a photograph, an audio recording, a video, a text, or any combination thereof. The media content item 702 can be captured by the first client device 102 using camera included in the first client device 102 or coupled to the first client device 102. The user interface 700 includes the media content item 702 and a plurality of icons that are used to augment the media content item 702 with text, audio, edits, drawings, animations, stickers, special effects, etc. The sticker menu icon 704 is one of the plurality of icons in the user interface 700. The sticker menu icon 704 is used to activate the sticker menu user interface 800.

FIG. 8 illustrates the user interface 800 displayed on a client device 102 in accordance with one embodiment. The user interface 800 can be displayed on the first client device 102 that is creating a media content item for the shared collection. The user interface 800 includes different media overlays that can be applied to augment the media content item 702. The media overlays can include a plurality of images (e.g., stickers) that can be static or animated (e.g., images of cat, bear, snail, turtle, etc.). The media overlays can also include the invitation media overlay selectable item 802. The invitation media overlay selectable item 802 is associated with a sticker that invites a recipient user to join a collection of media content items. In one embodiment, the sticker is a shared story sticker that invites the recipient to join a shared collection of media content items.

FIG. 9 illustrates the user interface 900 displayed on the client device 102 in accordance with one embodiment. User interface 900 includes the text input item 902, the privacy selectable item 904, and the shared selectable item 906. The text input item 902 can receive a text that is input by the first user that is the title of the shared collection or story. The text can also be included in the shared story sticker (e.g., invitation media overlay 1104) being generated.

The first user has the alternative to select the privacy selectable item 904 or the shared selectable item 906. Selecting the privacy selectable item 904 causes the story to be a shared collection such that only the first user has the permission to modify the shared collection and the contents of the shared collection. Selecting the shared selectable item 906 causes the story to be a shared collection such that the users in the private group are able to modify the shared collection and the contents of the shared collection.

FIG. 10 illustrates the user interface 1000 displayed on the client device 102 in accordance with one embodiment. The user interface 1000 illustrates the first user inputting the title of the shared collection in the text input item 902 (e.g., "Cats of Santa Monica"), which is also the text in the invitation media overlay 1104.

FIG. 11 illustrates the user interface 1100 displayed on the client device 102 in accordance with one embodiment. Once the text is inputted in text input item 902 in user interface 900 and the shared selectable item 906 is selected to generate the invitation media overlay 1104, the user interface 1100 is caused to be displayed on the first client device 102. The user interface 1100 comprises the modified media content item 1102 that includes the invitation media overlay 1104 overlaid on the media content item 702.

Figure 12:
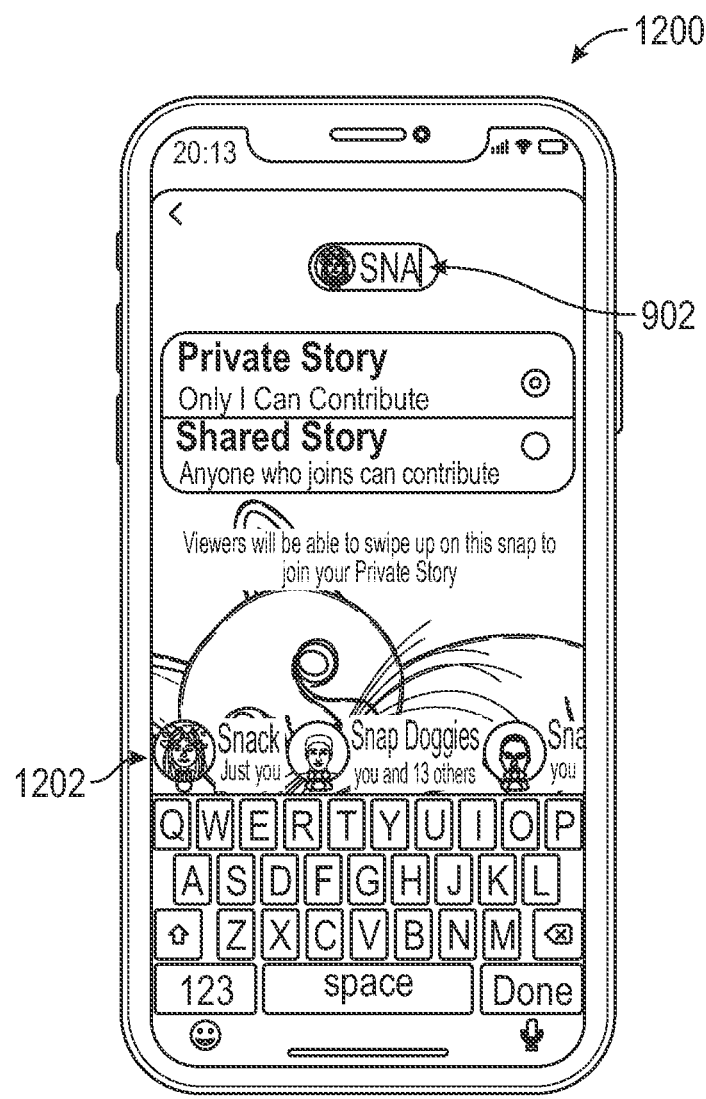
FIG. 12 illustrates a user interface 1200 displayed on a client device in accordance with one embodiment.

FIG. 12 illustrates the user interface 1200 displayed on the client device 102 in accordance with one embodiment.

User interface 1200 illustrates when the first user is generating a media content item that is to be added to an existing shared collection. When the first user input a portion of text in text input item 902 (e.g., "sna"), a plurality of collection selectable items 1202 that have titles that include that portion of text are displayed in user interface 1200 (e.g., "Snack", "Snap Doggies", etc.).

In another example, if the first user input a portion of text "Cats", a collection selectable item associated with the shared collection (e.g., "Cats of Santa Monica") can appear in the plurality of collection selectable items 1202 in user interface 1200. In this example, the first user can add an additional media content item to the shared collection "Cats of Santa Monica" by selecting the collection selectable item associated with the shared collection (e.g., "Cats of Santa Monica").

Figure 13:
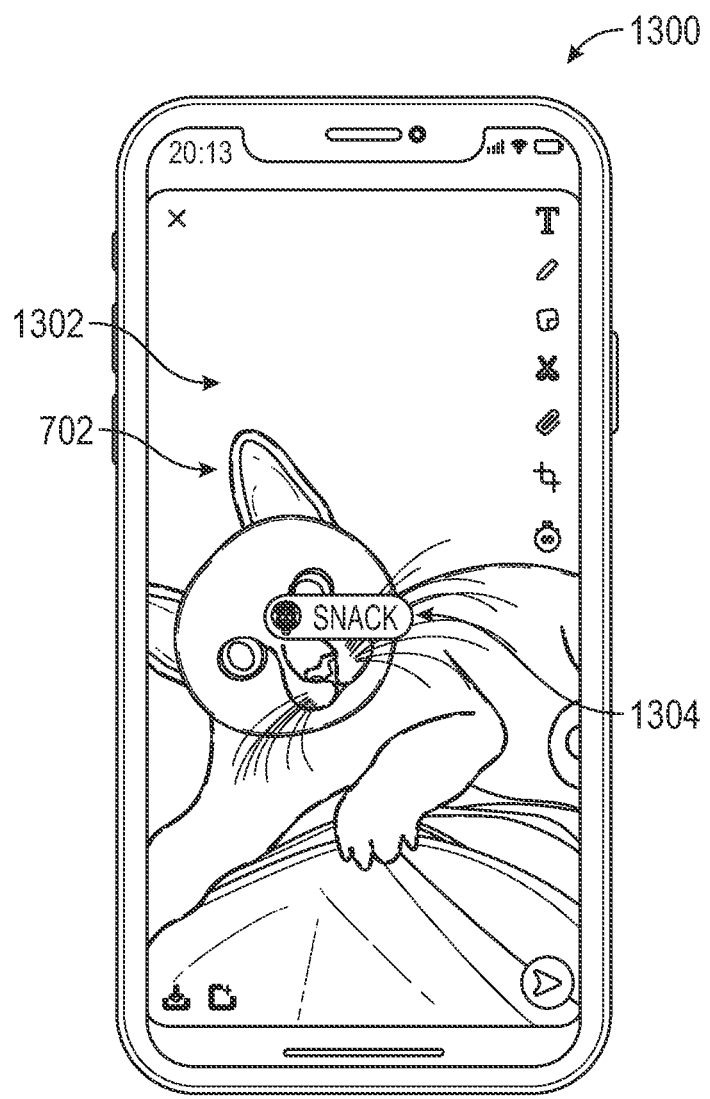
FIG. 13 illustrates a user interface 1300 displayed on a client device in accordance with one embodiment.

FIG. 13 illustrates the user interface 1300 displayed on the client device 102 in accordance with one embodiment.

In user interface 1200, when the first user selects the collection selectable item "Snack" in the collection selectable items 1202 and activates the privacy selectable item 904, the user interface 1300 in FIG. 13 is caused to be displayed. The user interface 1300 comprises the modified media content item 1302 that includes the invitation media overlay 1304 overlaid on the media content item 702. The invitation media overlay 1304 includes the text "Snack" and is associated with the shared collection titled "Snack".

FIG. 14 illustrates the user interface 1400 displayed on the second client device 102 and the third client device 102 in accordance with one embodiment.

The user interface 1400 is displayed to the second user when the second user receives the modified media content item 1102 as a story. The user interface 1400 is also displayed to the third user when the third user receives the modified media content item 1102 as a story. The modified media content item 1102 is received as a story when the first client device 102 broadcasts the modified media content item 1102 to the private group and the story is associated with a story icon on each user in the private group's client device 102.

Figure 16:
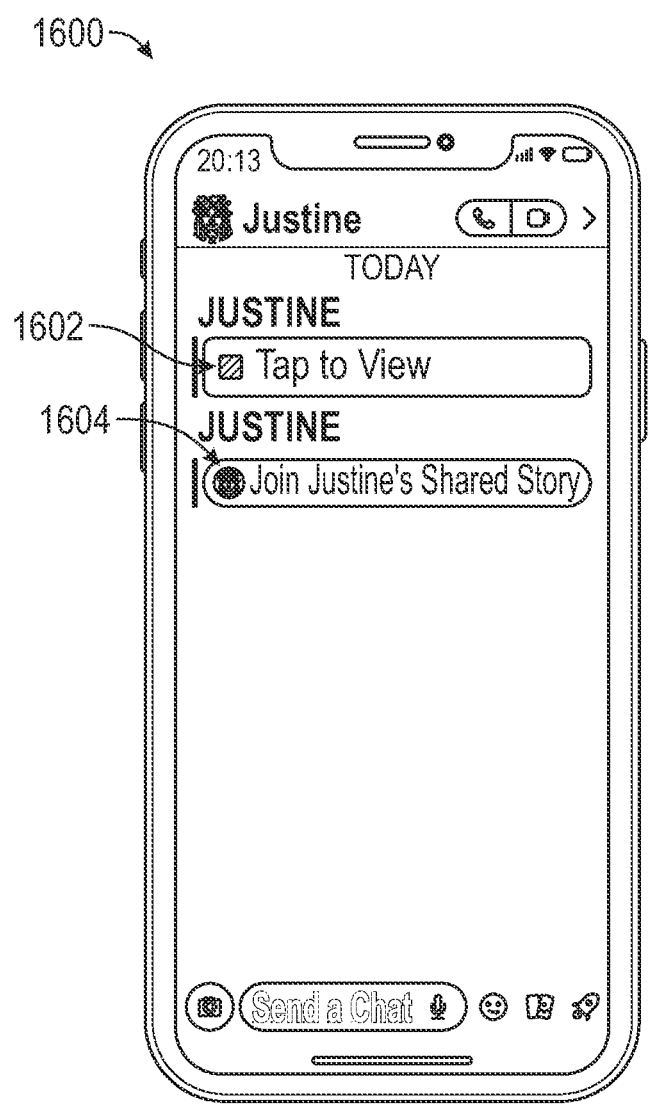
FIG. 16 illustrates a user interface 1600 displayed on a client device in accordance with one embodiment.

The user interface 1400 can also be displayed by the second client device 102 or the third client device 102 when the second user or the third user activates a direct message notification 1602 in FIG. 16 associated with the modified media content item 1102.

The user interface 1400 includes the modified media content item 1102 with the invitation media overlay 1104 and invitation response selectable item 1402. The second user or the third user can activate the invitation media overlay 1104 or the invitation response selectable item 1402 to join the private group and gain viewing privileges to the shared collection.

When the second user or the third user activates the invitation response selectable item 1402, the user interface 1500 in FIG. 15 is caused to be displayed by the second client device 102 or the third client device 102, respectively, in accordance to one embodiment.

The user interface 1500 comprises invitation details display 1502 which can be a pop-up or scroll-up notification that is overlaid on the user interface 1400. The invitation details display 1502 can include the information included in the invitation media overlay 1104 such as the text (e.g., "Cats of Santa Monica") and the icon with the first user's avatar. The invitation details display 1502 can also include text that invites the second user or the third user to join the story or collection. For example, the text can indicate that the first user invites the second user or the third user to view and contribute to the shared collection of media content items (e.g., "Justine invited you to contribute to their shared story!"). For example, contributing can include editing, adding, removing, or commenting on media content items in the shared collection. The invitation details display 1502 also includes an invitation details response selectable item 1504. The second user or the third user can select the invitation details response selectable item 1504 to respond to the invitation to join the shared story.

FIG. 16 illustrates the user interface 1600 displayed on the second client device 102 or the third client device 102 in accordance with one embodiment. When the first user sends the first modified media content item 1102 to the second user or the third user as a direct message, the user interface 1600 is caused to be displayed by the second client device 102 or the third client device 102, respectively. The user interface 1600 comprises direct message notification 1602 that is associated with the modified media content item 1102. Activation of the direct message notification 1602 causes the modified media content item 1102 to be displayed by the second client device 102 or the third client device 102. In one embodiment, the selection or activation of the direct message notification 1602 can cause the user interface 1400 including the modified media content item 1102 to be displayed.

The user interface 1600 also comprises the direct message invitation selectable item 1604 that is associated with the shared collection. The direct message invitation selectable item 1604 can include an icon with the first user's avatar and a text inviting the second user to join the shared collection.

Figure 17:
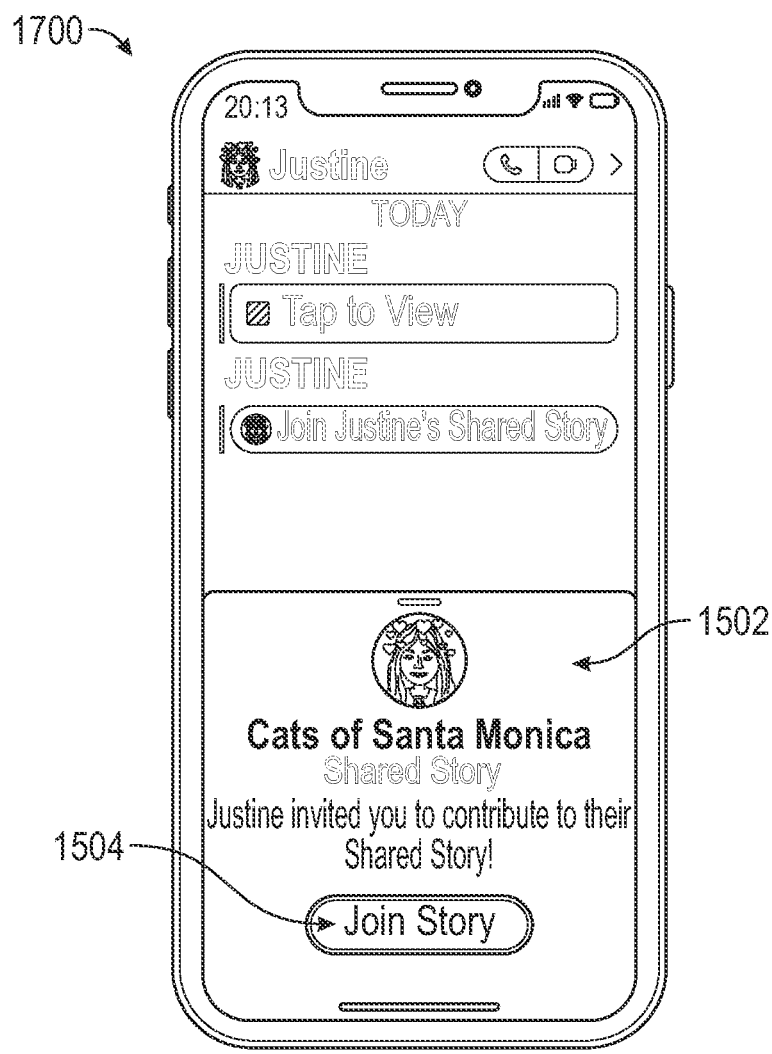
FIG. 17 illustrates a user interface 1700 displayed on a client device in accordance with one embodiment.

When the direct message invitation selectable item 1604 is activated by the second user or the third user, the user interface 1700 in FIG. 17 can be displayed by the second client device 102 or the third client device 102 in accordance with one embodiment.

The user interface 1700 comprises the invitation details display 1502 which can be a pop-up or scroll-up notification that is overlaid on the user interface 1600. The invitation details display 1502 can include the information included in the invitation media overlay 1104 such as the text (e.g., "Cats of Santa. Monica") and the icon with the first user's avatar. The invitation details display 1502 can also include text that invites the second user or the third user to join the story or collection. For example, the text can indicate that the first user invites the second user or the third user to view and contribute the shared collection of media content items (e.g., "Justine invited you to contribute to their shared story!"). For example, contributing can include editing, adding, removing, or commenting on media content items in the shared collection. The invitation details display 1502 also includes an invitation details response selectable item 1504. The second user can select the invitation details response selectable item 1504 to respond to the invitation to join the shared story.

Machine Architecture

Figure 18:
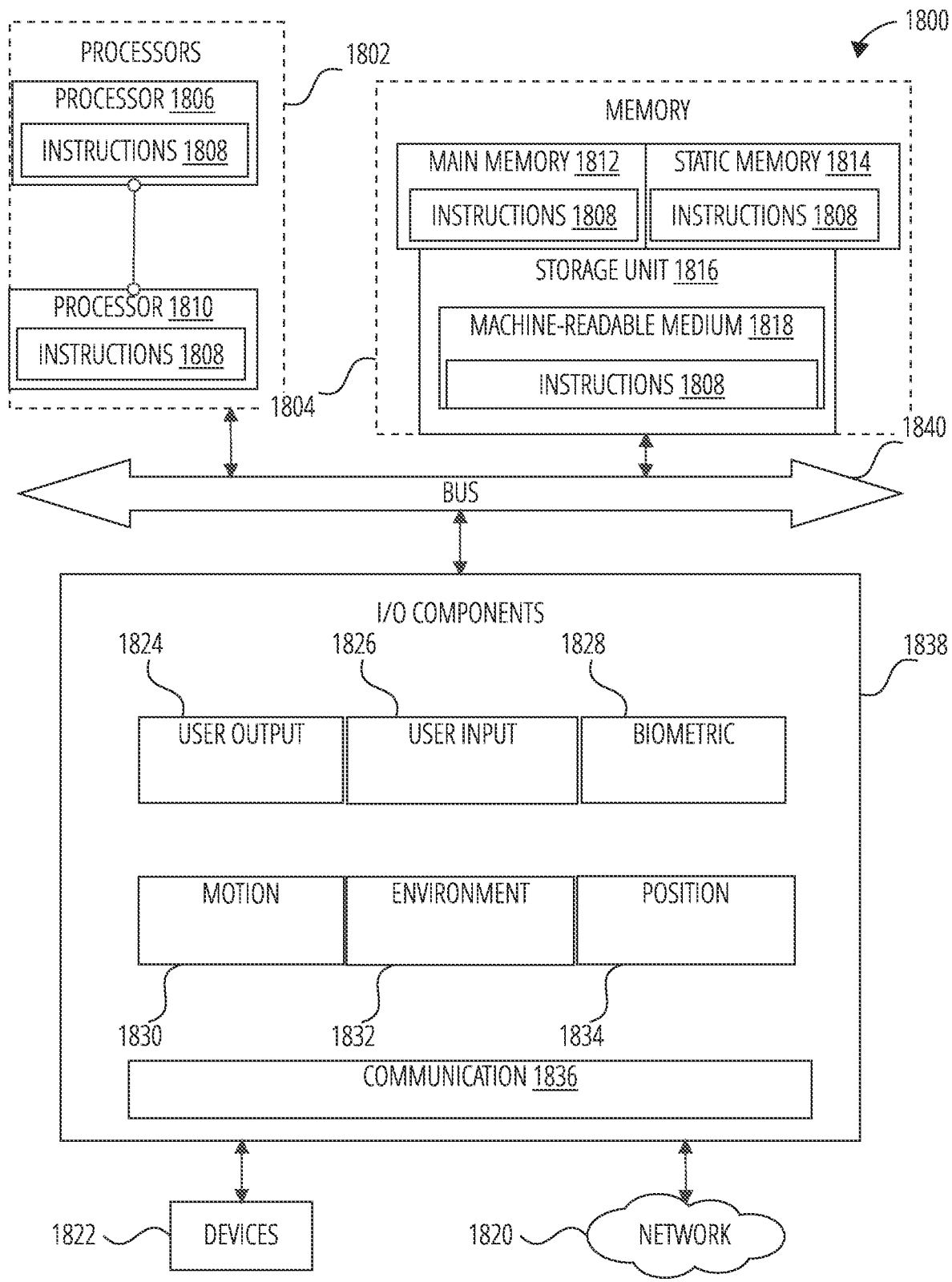
FIG. 18 is a diagrammatic representation of a machine in the form of a computer system within which a set of instructions may be executed for causing the machine to perform any one or more of the methodologies discussed herein, in accordance with some examples.

FIG. 18 is a diagrammatic representation of the machine 1800 within which instructions 1808 (e.g., software, a program, an application, an apples, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein. The machine 1800, for example, may comprise the client device 102 or any one of a number of server devices forming part of the messaging server system 108. In some examples, the machine 1800 may also comprise both client and server systems, with certain operations of a particular method or algorithm being performed on the server-side and with certain operations of the particular method or algorithm being performed on the client-side.

The machine 1800 may include processors 1802, memory 1804, and input/output I/O components 638, which may be configured to communicate with each other via a bus 1840. In an example, the processors 1802 (e.g., a Central Processing Unit (CPU), a Reduced Instruction Set Computing (RISC) Processor, a Complex instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1806 and a processor 1810 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single-core, a single processor with multiple cores (e.g., a multi-core processor), multiple processors with a single core, multiple processors with multiples cores, or any combination thereof.

The memory 1804 includes a main memory 1812, a static memory 1814, and a storage unit 1816, both accessible to the processors 1802 via the bus 1840. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the processors 1802 (e.g., within the Processor's cache memory), or any suitable combination thereof, during execution thereof by the machine 1800.

The I/O components 1838 may include a wide variety of components to receive input, provide output, produce output, transmit information, exchange information, capture measurements, and so on. The specific I/O components 1838 that are included in a particular machine will depend on the type of machine. For example, portable machines such as mobile phones may include a touch input device or other such input mechanisms, while a headless server machine will likely not include such a touch input device. It will be appreciated that the I/O components 1838 may include many other components that are not shown in FIG. 18. In various examples, the I/O components 1838 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1838 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1830 include acceleration sensor components (e.g., accelerometer), gravitation sensor components, rotation sensor components (e.g., gyroscope).

The environmental components 1832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1834 include location sensor components a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1838 further include communication components 1836 operable to couple the machine 1800 to a network 1820 or devices 1822 via respective coupling or connections. For example, the communication components 1836 may include a network interface Component or another suitable device to interface with the network 1820. In further examples, the communication components 1836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1822 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (REM) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1812, static memory 1814, and memory of the processors 1802) and storage unit 1816 may store one or more sets of instructions and data structures (e.g., software) embodying or used by any one or more of the methodologies or functions described herein. These instructions (e.g., the instructions 1808), when executed by processors 1802, cause various operations to implement the disclosed examples.

The instructions 1808 may be transmitted or received over the network 1820, using a transmission medium, via a network interface device (e.g., a network interface component included in the communication components 1836) and using any one of several well-known transfer protocols (e.g., hypertext transfer protocol (HTTP)). Similarly, the instructions 1808 may be transmitted or received using a transmission medium via a coupling (e.g., a peer-to-peer coupling) to the devices 1822.

Software Architecture

Figure 19:
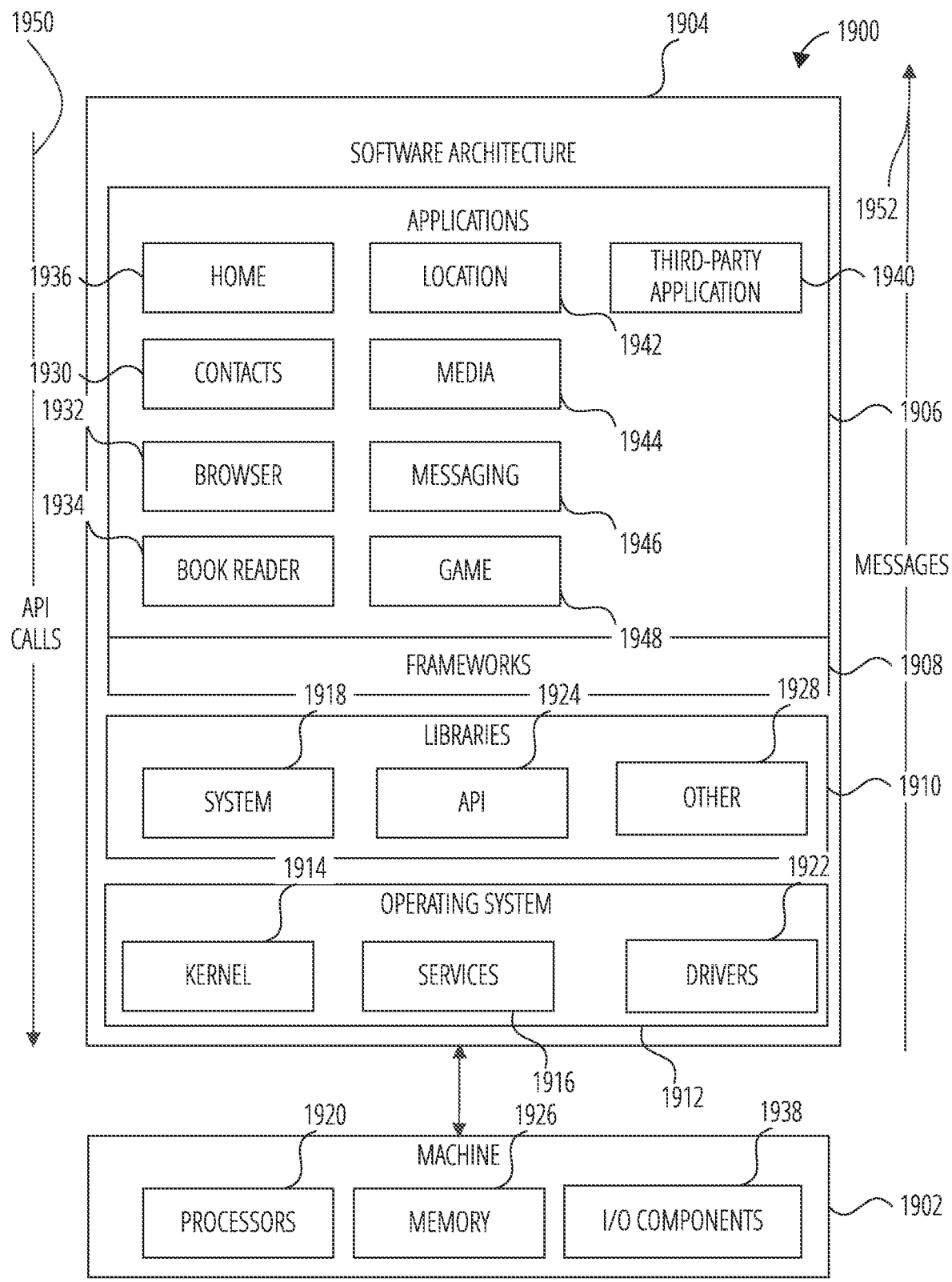
FIG. 19 is a block diagram showing a software architecture within which examples may be implemented.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1910 provide a common low-level infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or PG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a common high-level infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example, the applications 1906 may include a home application 1936, a contacts application 1930, a browser application 1932, a book reader application 1934, a location application 1942, a media application 1944, a messaging application 1946, a game application 1948, and a broad assortment of other applications such as a third-party application 1940. The applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

Processing Components

Figure 20:
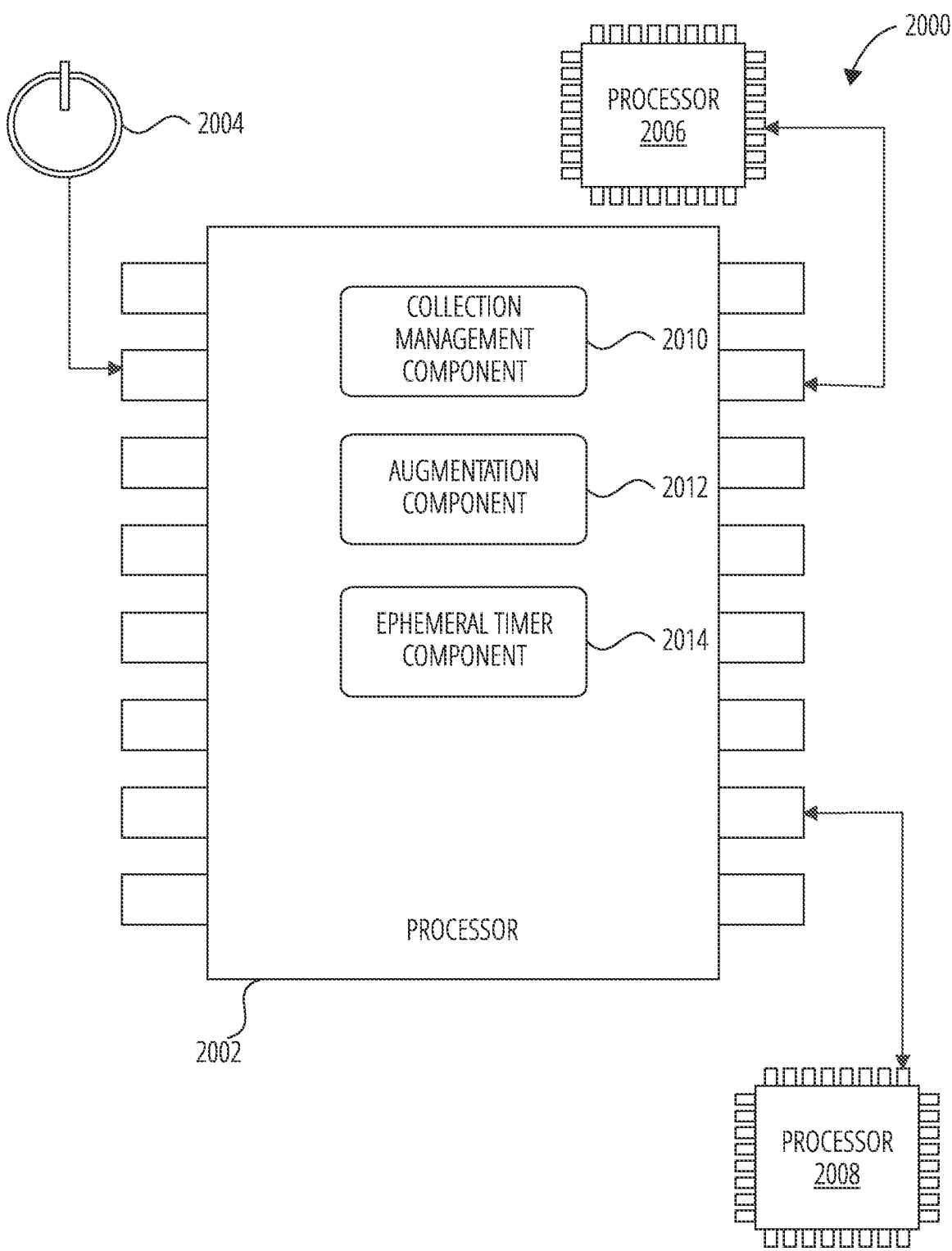
FIG. 20 is a diagrammatic representation of a processing environment, in accordance with some examples.

Turning now to FIG. 20, there is shown a diagrammatic representation of a processing environment 2000, which includes a processor 2002, a processor 2006, and a processor 2008 (e.g., a GPU, CPU or combination thereof).

The processor 2002 is shown to be coupled to a power source 2004, and to include (either permanently configured or temporarily instantiated) modules, namely a collection management component 2010, an augmentation component 2012, and an ephemeral timer component 2014. The collection management component 2010 operationally generates and manages the shared collection of media content items, the augmentation component 2012 operationally generates the invitation media overlays, and the ephemeral timer component 2014 operationally manages the access time associated with each of the media content items in the shared collection. As illustrated, the processor 2002 is communicatively coupled to both the processor 2006 and the processor 2008.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors it will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
generating, by a processor, a modified first media content item including a first media content item received from a first client device associated with a first user and an invitation media overlay being overlaid on the first media content item, wherein the invitation media overlay comprises a name associated with a shared collection of media content items;
generating the shared collection of media content items, the shared collection of media content items comprises the modified first media content item;
causing the modified first media content item to be displayed by a second client device and a third client device;
receiving a selection of the invitation media overlay of the modified first media content item from the second client device and from the third client device that causes a second user of the second client device and a third user of the third client device to join a private group associated with the shared collection of media content items;
generating a modified second media content item including a second media content item from the second client device and the invitation media overlay being overlaid on the second media content item;
updating the shared collection of media content items to comprise the modified second media content item; and
causing the updated shared collection of media content items to be displayed by the first client device or the third client device.

2. The method of claim 1, further comprising:
receiving from the first client device a selection of the second user and the third user; and
generating the private group associated with the shared collection of media content items, the private group comprising the first user, the second user, and the third user.

3. The method of claim 2, further comprising:
causing a shared selectable item to be displayed by the first client device;
receiving a selection of the shared selectable item from the first client device; and
in response to receiving the selection of the shared selectable item from the first client device, establishing that the shared collection of media content items can be modified by users in the private group.

4. The method of claim 1, further comprising:
causing a text input item to be displayed by the first client device; and
receiving the name via the text input item from the first client device, wherein the invitation media overlay comprises the name.

5. The method of claim 4, wherein the invitation media overlay further comprises an icon, wherein the icon comprises at least one avatar of a user in the private group.

6. The method of claim 4, further comprising:
causing the text input item to be displayed by the second client device; and
wherein receiving the text input from the second client device comprises receiving a portion of the name via the text input item from the second client device.

7. The method of claim 6,
wherein a plurality of collection selectable items are associated with a plurality of collections, wherein the plurality of collections are associated with the portion of the name, and the plurality of collections comprise the shared collection of media content items.

8. The method of claim 1, wherein the first media content item and the second media content item are at least one of images, pictures, videos, or text.

9. The method of claim 8, wherein the first media content item and the second media content item are captured using a camera on the first client device and a camera on the second client device, respectively.

10. A system comprising:

a processor; and a memory having instructions stored thereon, when executed by the processor, causes the system to perform operations comprising:

generating a modified first media content item including a first media content item received from a first client device associated with a first user and an invitation media overlay being overlaid on the first media content item, wherein the invitation media overlay comprises a name associated with a shared collection of media content items;

generating the shared collection of media content items, the shared collection of media content items comprises the modified first media content item;

causing the modified first media content item to be displayed by a second client device and a third client device;

receiving a selection of the invitation media overlay of the modified first media content item from the second client device and from the third client device that causes a second user of the second client device and a third user of the third client device to join a private group associated with the shared collection of media content items;

generating a modified second media content item including a second media content item from the second client device and the invitation media overlay being overlaid on the second media content item;

updating the shared collection of media content items to comprise the modified second media content item; and causing the updated shared collection of media content items to be displayed by the first client device or the third client device.

11. The system of claim 10, wherein the operations further comprising:

receiving from the first client device a selection of the second user and the third user; and generating the private group associated with the shared collection of media content items, the private group comprising the first user, the second user, and the third user.

12. The system of claim 11, wherein the operations further comprising:

causing a shared selectable item to be displayed by the first client device;

receiving a selection of the shared selectable item from the first client device; and in response to receiving the selection of the shared selectable item from the first client device, establishing that the shared collection of media content items can be modified by users in the private group.

13. The system of claim 10, wherein the operations further comprising:

causing a text input item to be displayed by the first client device; and receiving the name via the text input item from the first client device, wherein the invitation media overlay comprises the name.

14. The system of claim 13, wherein the invitation media overlay further comprises an icon, wherein the icon comprises at least one avatar of a user in the private group.

15. The system of claim 13, wherein the operations further comprising:

causing the text input item to be displayed by the second client device; and wherein receiving the text input from the second client device comprises receiving a portion of the name via the text input item from the second client device.

16. The system of claim 15, wherein a plurality of collection selectable items are associated with a plurality of collections, wherein the plurality of collections is associated with the portion of the name, and the plurality of collections comprises the shared collection of media content items.

17. The system of claim 10, wherein the first media content item and the second media content item are at least one of images, pictures, videos, or text.

18. The system of claim 17, wherein the first media content item and the second media content item are captured using a camera on the first client device and a camera on the second client device, respectively.

19. A non-transitory computer-readable storage medium having stored thereon instructions, when executed by a processor, causes the processor to perform operations comprising:

generating a modified first media content item including a first media content item received from a first client device associated with a first user and an invitation media overlay being overlaid on the first media content item, wherein the invitation media overlay comprises a name associated with a shared collection of media content items;

generating the shared collection of media content items, the shared collection of media content items comprises the modified first media content item;

causing the modified first media content item to be displayed by a second client device and a third client device;

receiving a selection of the invitation media overlay of the modified first media content item from the second client device and from the third client device that causes a second user of the second client device and a third user of the third client device to join a private group associated with the shared collection of media content items;

generating a modified second media content item including a second media content item from the second client device and the invitation media overlay being overlaid on the second media content item;

updating the shared collection of media content items to comprise the modified second media content item; and causing the updated shared collection of media content items to be displayed by the first client device or the third client device.

20. The non-transitory computer-readable storage medium of claim 19, wherein the operations further comprising:

receiving from the first client device a selection of the second user and the third user;

generating the private group associated with the shared collection of media content items, the private group comprising the first user, the second user, and the third user.

* * * * *